United States Patent [19]
Jäckel

[11] Patent Number: 5,301,780
[45] Date of Patent: * Apr. 12, 1994

[54] TORQUE TRANSMITTING APPARATUS

[75] Inventor: Johann Jäckel, Baden-Baden, Fed. Rep. of Germany

[73] Assignee: Luk Lamellen und Kupplungsbau GmbH, Buhl, Fed. Rep. of Germany

[ * ] Notice: The portion of the term of this patent subsequent to Sep. 29, 2009 has been disclaimed.

[21] Appl. No.: 708,938

[22] Filed: May 31, 1991

[30] Foreign Application Priority Data

| May 31, 1990 | [DE] | Fed. Rep. of Germany | 4017519 |
| Jun. 29, 1990 | [DE] | Fed. Rep. of Germany | 4020759 |
| Aug. 31, 1990 | [DE] | Fed. Rep. of Germany | 4027542 |
| Aug. 31, 1990 | [DE] | Fed. Rep. of Germany | 4027593 |
| Aug. 31, 1990 | [DE] | Fed. Rep. of Germany | 4027614 |
| Aug. 31, 1990 | [DE] | Fed. Rep. of Germany | 4027629 |
| Dec. 24, 1990 | [DE] | Fed. Rep. of Germany | 4041709 |
| Dec. 24, 1990 | [DE] | Fed. Rep. of Germany | 4041722 |

[51] Int. Cl.$^5$ .............................................. F16F 15/12
[52] U.S. Cl. ............................ 192/70.17; 192/106.2; 74/574; 464/68
[58] Field of Search ................... 192/70.17, 106.2; 74/574; 464/68

[56] References Cited

U.S. PATENT DOCUMENTS

| 4,493,409 | 1/1985 | Steeg | 192/115 |
| 4,747,586 | 5/1988 | Reik | 267/161 |
| 4,856,636 | 8/1989 | Meinhard | 192/70.17 |
| 4,989,710 | 2/1991 | Reik | 192/70.17 |
| 5,042,632 | 8/1991 | Jäckel | 74/574 X |

FOREIGN PATENT DOCUMENTS

3721706  1/1988  Fed. Rep. of Germany .

Primary Examiner—Leslie A. Braun
Assistant Examiner—Andrea Pitts
Attorney, Agent, or Firm—Darby & Darby

[57] ABSTRACT

Apparatus for transmitting torque between the engine and the transmission of a motor vehicle has a first flywheel which receives torque from the engine, a second flywheel which receives torque from the first flywheel by way of one or more dampers and a disc and is at least partially encapsulated in the first flywheel in the axial direction of the flywheels, and a friction clutch which serves to couple the second flywheel with or to uncouple the second flywheel from the transmission. A substantial part of the clutch is also encapsulated into the first flywheel so that the dimensions of the apparatus in the axial direction of the flywheels are sufficiently small to warrant its use in motor vehicles with transversely extending engines and transmissions.

40 Claims, 2 Drawing Sheets

TORQUE TRANSMITTING APPARATUS

BACKGROUND OF THE INVENTION

The invention relates to torque transmitting apparatus in general, and more particularly to improvements in apparatus for transmitting torque between the engines and variable-speed transmissions of motor vehicles. Still more particularly, the invention relates to improvements in torque transmitting apparatus of the type employing composite flywheels with one or more dampers between the flywheels.

Published German patent application No. 37 21 706 of Wolfgang Reik (published Jan. 7, 1988) discloses a torque transmitting apparatus wherein a first rotary flywheel is connectable to the rotary output element of the engine in a motor vehicle and a second flywheel is rotatable relative to and is coaxial with the first flywheel and is connectable by a friction clutch to the rotary input element of a variable-speed transmission in the motor vehicle. A bearing is installed between the two flywheels, and a damper with circumferentially acting coil springs is employed to oppose rotation of the flywheels relative to each other. The coil springs are confined in an annular chamber which is at least partially filled with a viscous fluid and is defined, at least in part, by the first flywheel. The latter is made by suitably shaped metallic sheet material, and the apparatus further comprises a disc-shaped member which is connected for rotation with the second flywheel and cooperates with the coil springs in the annular chamber. The disc-shaped member is made of metallic sheet material and extends into the annular chamber substantially diametrically of the coil springs.

Torque transmitting apparatus of the just described character are popular in motor vehicles wherein the engine and the transmission extend in the direction of forward movement of the vehicle because such vehicles provide ample room for the two flywheels as well as for the friction clutch which is used to engage the second flywheel with, or to disengage the second flywheel from, the input element of the transmission.

The situation is different in motor vehicles with transversely extending engine-transmission aggregates. The numerous advantages of the aforedescribed torque transmitting apparatus render it desirable to employ such apparatus for transmission of torque between a transversely extending engine and a transversely extending transmission; however, the space which is available under the hoods of such motor vehicles does not suffice to provide room for presently known torque transmitting apparatus with composite flywheels and friction clutches between such flywheels and the transmissions.

OBJECTS OF THE INVENTION

An object of the invention is to provide a torque transmitting apparatus which is sufficiently compact to be put to use in motor vehicles with transversely extending engine-transmission aggregates.

Another object of the invention is to provide an apparatus which renders it possible to achieve optimal torque transmission and damping rates.

A further object of the invention is to provide novel and improved flywheels for use in the above outlined apparatus.

An additional object of the invention is to provide a novel and improved friction clutch for use in the above outlined torque transmitting apparatus.

Still another object of the invention is to provide an apparatus which is designed by full consideration of the required moments of inertia.

A further object of the invention is to provide a simple and inexpensive torque transmitting apparatus which can be used with advantage in all kinds of motor vehicles including low-cost compact cars.

An additional object of the invention is to provide a novel and improved method of assembling the constituents of the above outlined apparatus into a unit which can be conveniently stored, transported and/or mounted in a motor vehicle.

Another object of the invention is to provide a novel and improved method of shortening the torque transmitting apparatus in the axial direction of its flywheels.

A further object of the invention is to provide a motor vehicle which embodies the above outlined torque transmitting apparatus.

An additional object of the invention is to assemble the constituents of the torque transmitting apparatus in such a way that all of its parts are held together for convenient and time-saving mounting in a motor vehicle.

Another object of the invention is to provide a torque transmitting apparatus which constitutes an improvement over and a further development of apparatus of the type described in published German patent application No. 37 21 706.

SUMMARY OF THE INVENTION

One feature of the present invention resides in the provision of an apparatus for transmitting torque in a motor vehicle. The improved apparatus comprises a first rotary flywheel which is connectable with the engine of the motor vehicle and includes a toroidal portion defining at least a portion of an annular chamber which is at least partially filled with a viscous fluid, a second rotary flywheel which is connectable with the transmission of the motor vehicle by a clutch having an annular friction surface, at least one bearing between the flywheels, and at least one damper provided in the annular chamber and serving to oppose rotation of the flywheels relative to each other. The at least one damper includes energy storing elements which are installed to act in the circumferential direction of the flywheels, and the apparatus further comprises a substantially disc-shaped member which is rotatable with the second flywheel and comprises portions extending into the annular chamber to engage the energy storing elements of the at least one damper. The toroidal portion of the first flywheel is disposed radially outwardly of the friction surface and surrounds a space which receives at least a portion of the second flywheel. Such portion of the second flywheel extends into the space in the axial direction of the flywheels.

The second flywheel has a second friction surface which extends into the aforementioned space.

Those portions of the disc-shaped member which engage the energy storing elements are preferably inclined in a direction outwardly and away from the first flywheel (i.e., away from the engine which is connected to the first flywheel), and such portions of the disc-shaped member are disposed radially outwardly of that portion of the second flywheel which extends into the space within the toroidal portion of the first flywheel.

The axially protruding portion of the second flywheel is preferably encapsulated into the first flywheel within the aforementioned space, and such space preferably further accommodates at least a portion of the at least one bearing and the friction surface of the second flywheel. The arrangement can be such that the at least one bearing is fully received in the space and that the encapsulated portion constitutes the major part of the second flywheel.

The friction surface of the clutch is provided on an axially movable pressure plate, and the clutch further comprises a clutch plate having friction linings between the friction surface of the pressure plate and the friction surface of the second flywheel. The friction linings of the clutch plate are preferably received in the space which is surrounded by the toroidal portion of the first flywheel.

The friction surface of the pressure plate is preferably located in the aforementioned space.

The toroidal portion of the first flywheel can include a substantially ring-shaped wall which spacedly surrounds the encapsulated portion of the second flywheel. The energy storing elements of the at least one damper together form an annulus having an inner diameter which at most equals the inner diameter of the ring-shaped wall. The apparatus can further comprise an annular membrane which seals the chamber from the atmosphere or forms part of such sealing means. The membrane has a radially outer portion which sealingly engages the ring-shaped wall, a median portion of the membrane preferably snugly overlies the encapsulated portion of the second flywheel, and a radially inner portion of the membrane sealingly engages the disc-shaped member The second flywheel can be provided with ventilating openings which are adjacent the membrane.

The encapsulated portion of the second flywheel includes a radially outermost zone, and at least such zone of the encapsulated portion of the second flywheel includes facilities which enhance the transfer of heat Such facilities can include ribs and/or passages which communicate with an outlet defined by the two flywheels and connecting the aforementioned space with the atmosphere.

The two flywheels and the clutch preferably constitute a preassembled unit which is connectable to the engine of a motor vehicle by connecting the first flywheel to the rotary output element of the engine The at least one bearing can form part of such preassembled unit. The first flywheel preferably comprises a centrally disposed axial protuberance which is surrounded by the at least one bearing. The protuberance is provided with holes for screws, bolts or other suitable fasteners which serve to connect the first flywheel to the engine. The apparatus preferably comprises means for confining the fasteners in the unit against loss and/or displacement. Such confining means can comprise deformable (e.g., elastically yieldable) fastener-engaging parts in the unit.

The clutch comprises a pressure plate which is provided with the friction surface, and a clutch plate which is disposed between the friction surface of the pressure plate and the friction surface of the second flywheel. The second flywheel and the pressure plate center the clutch plate in the preassembled unit so that such centering need not be carried out subsequent to connection of the first flywheel to the engine The clutch plate can be provided with openings which are at least partially aligned with the holes of the first flywheel to permit introduction of the working end of a torque transmitting tool through the openings and into engagement with the heads of fasteners which are to be applied in order to connect the first flywheel to the rotary output element of the engine Additional openings can be provided in the diaphragm spring of the clutch, and each additional opening is in partial or full axial alignment with an opening in the clutch plate so that a tool which is used to manipulate the fasteners can be introduced first through an opening of the diaphragm spring (such opening can be provided in or between the prongs of the diaphram spring) and thereupon through the at least partially aligned opening of the clutch plate prior to engaging the head of a fastener which is to be driven into the output element of the engine. The openings of the clutch plate can be in full or partial (but sufficient) axial alignment with the adjacent openings of the diaphragm spring and with the adjacent holes of the first flywheel.

The openings of the diaphragm spring can be equidistant from each other (as seen in the circumferential direction of the flywheels) even if the openings of the clutch plate and/or the holes of the first flywheel are not equidistant, as long as the extent of alignment suffices to permit introduction of the working end of a torque transmitting tool first through an opening of the spring, thereupon through an opening of the clutch plate and thereafter into engagement with a fastener having an externally threaded shank which extends into the fully or partially aligned hole of the first flywheel The dimensions of openings in the diaphragm spring and/or in the clutch plate can be selected in such a way that they do not permit the passage of largest portions (e.g., heads of screws) of fasteners which are used to connect the first flywheel to the engine.

The preassembled unit is preferably designed in such a way that the clutch and the first flywheel provide adequate room for confinement of fasteners in such positions that the shanks of the fasteners can extend into but not outwardly beyond the holes in the first flywheel, i.e , each of the fasteners can be fully confined in the preassembled unit during storage or transport of the unit as well as preparatory to connection of the first flywheel to the engine. The heads of the fasteners which are confined in the preassembled unit can extend all the way or close to the clutch plate or all the way or close to the prongs of the diaphragm spring.

The apparatus preferably further comprises screws, bolts or other suitable means for separably securing the cover of the clutch to the second flywheel.

The apparatus can comprise a pilot bearing for the rotary input element of the transmission which is caused to pass through the hub of the clutch plate and thereupon into the pilot bearing. The latter can be installed in an axial passage which is defined by the aforementioned central protuberance of the first flywheel.

In accordance with a presently preferred embodiment, the clutch (which is preferably separably secured to the second flywheel) comprises a cover which receives torque from the second flywheel, a clutch plate which can be non-rotatably mounted on the input element of the transmission and is installed between the friction surface of the second flywheel and the cover, a pressure plate which is provided with the first mentioned friction surface and is installed between the cover and the clutch plate, a diaphragm spring which is disposed between the cover and the pressure plate and has a circumferentially complete annular outer portion serving to bear against the pressure plate in order to engage the friction surface of the pressure plate with the clutch plate and to urge the clutch plate against the friction surface of the second flywheel, a first annular seat which is disposed between the diaphragm spring and the cover and is installed radially inwardly of the annular outer portion of the diaphragm spring, a second annular seat which is disposed between the diaphragm spring and the pressure plate radially inwardly of the annular outer portion of the diaphragm spring, and a substantially washer-like carrier for the second seat. The carrier has preferably integral torque transmitting leaf springs which are connected with the pressure plate and are disposed radially inwardly of the second seat. The leaf springs can slope radially inwardly as well as in the circumferential direction of the flywheels from the second seat for the diaphragm spring toward the pressure plate.

The clutch can further comprise means for connecting the leaf springs to the pressure plate radially inwardly of the friction surface on the pressure plate.

The carrier is connected to the cover of the clutch, preferably by substantially inwardly extending projections in the form of lugs or the like which are affixed to the cover, e.g., by rivets which can form integral parts of the cover. Such rivets (or other suitable fasteners) can extend through openings which are provided in the projections of the carrier.

The prongs of the diaphragm spring preferably define openings in register with rivets which are preferably used to secure the leaf springs to the pressure plate The openings can be defined by enlarged portions of slots between neighboring inwardly extending prongs of the diaphragm spring. The arrangement is preferably such that each leaf spring is connected to the pressure plate by at least two rivets or other suitable fasteners.

The carrier is or can be integral with the second seat for the diaphragm spring.

Another feature of the invention resides in the provision of a torque transmitting apparatus which comprises (a) a first rotary flywheel connectable with the engine of a motor vehicle and including a toroidal portion which defines a first portion of an annular chamber and (b) a ring-shaped wall which defines a second portion of the chamber. A second flywheel which is coaxial with and is rotatable relative to the first flywheel and is connectable with the variable-speed transmission of the motor vehicle, and at least one damper which is provided in the chamber and serves to oppose rotation of the flywheels relative to each other. The damper includes an annulus of energy storing elements which act in the circumferential direction of the flywheels. The inner diameter of the annulus at most equals the inner diameter of the ring-shaped wall.

A further feature of the invention resides in the provision of a torque transmitting apparatus which comprises a first rotary flywheel connectable with the engine of a motor vehicle, and a second flywheel which is rotatable relative to and is coaxial with the first flywheel and can be connected to the transmission of the motor vehicle by a friction clutch having a clutch plate. The flywheels and the clutch together constitute a preassembled unit which is ready to be connected to the rotary input element of the engine in a motor vehicle by connecting the input element with the first flywheel.

An additional feature of the invention resides in the provision of a torque transmitting apparatus which comprises a first rotary flywheel connectable to the engine of a motor vehicle, and a second flywheel which is coaxial with and is rotatable relative to the first flywheel and is connectable to the transmission of the motor vehicle by a friction clutch having a clutch plate adjacent the second flywheel, a cover which is connected to the second flywheel, a pressure plate which is disposed between the cover and the clutch plate, a diaphragm spring which is disposed between the cover and the pressure plate and has a circumferentially complete annular outer portion serving to bear against the pressure plate in order to engage the pressure plate with the clutch plate and to thus urge the clutch plate against the second flywheel, a first annular seat which is disposed between the diaphragm spring and the cover radially inwardly of the annular outer portion of the diaphragm spring, a second annular seat which is disposed between the diaphragm spring and the pressure plate radially inwardly of the annular outer portion of the diaphragm spring, and a substantially washer-like carrier for the second seat. The carrier has integral torque transmitting leaf springs which are connected with the pressure plate and are disposed radially inwardly of the second seat.

The novel features which are considered as characteristic of the invention are set forth in particular in the appended claims The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
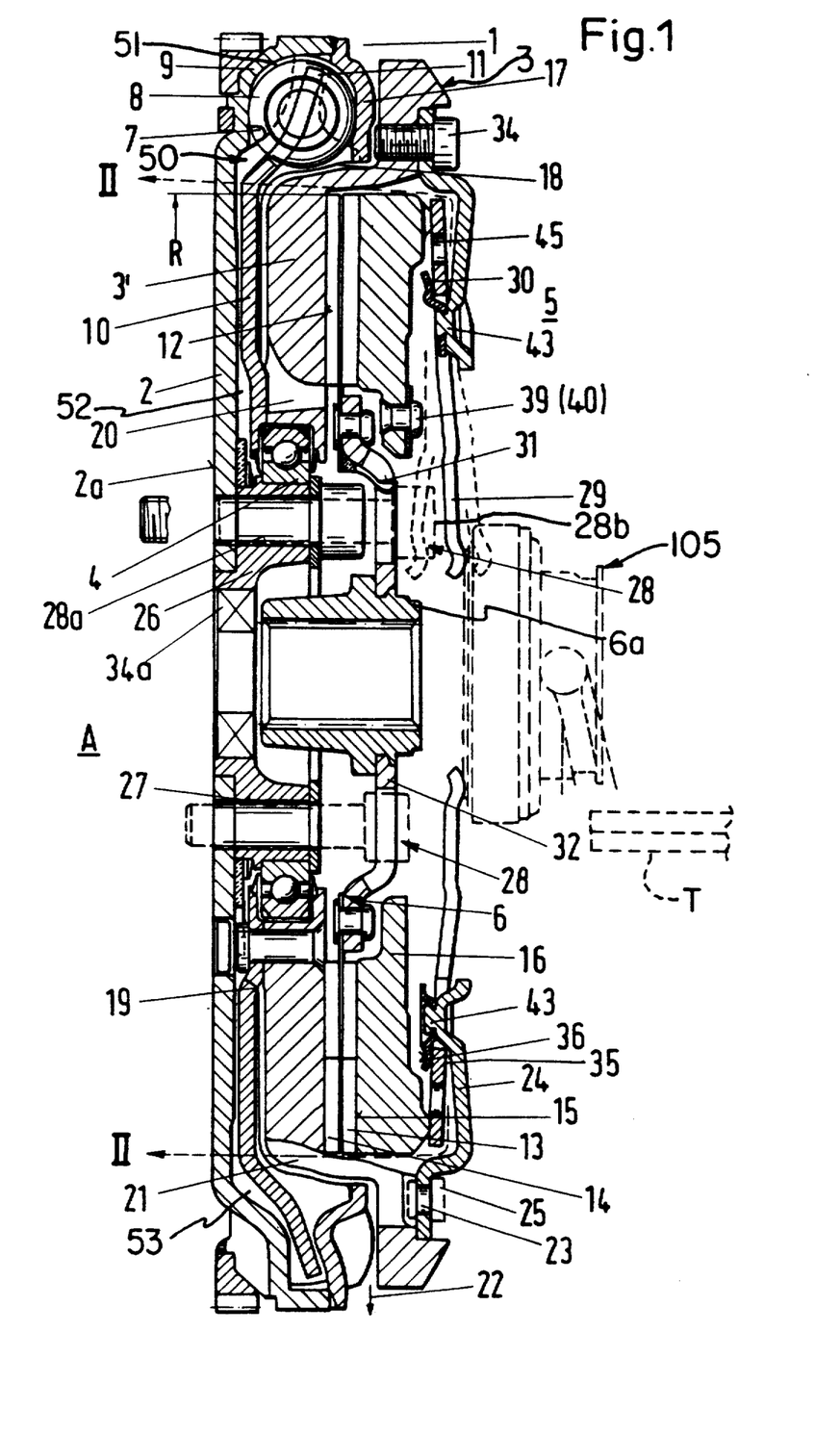
FIG. 1 is an axial sectional view of a torque transmitting apparatus which embodies one form of the invention.

The torque transmitting apparatus 1 which is shown in FIG. 1 comprises a substantially pot-shaped or pan-shaped first or primary flywheel 2, a secondary or second flywheel 3 which is coaxial with and is rotatable relative to the primary flywheel, a friction clutch 5 which can be engaged to connect the secondary flywheel with the rotary input shaft of a variable-speed transmission, an antifriction roller bearing 4 between the two flywheels, and a damper 7 which is installed in the radially outermost portion 51 of an annular chamber 50 and serves to oppose rotation of the flywheels relative to each other. The primary flywheel 2 is directly connectable to the rotary output element (e.g., a crankshaft) of an internal combustion engine in a motor vehicle Reference may be had to commonly owned U.S. Pat. No. 4,989,710 granted Feb. 5, 1991 to Wolfgang Reik et al. which shows a different torque transmitting apparatus installed between the engine and the variable-speed transmission of a motor vehicle. The construction and mode of operation of the engine and/or of the transmission form no part of the present invention. The clutch 5 comprises a clutch plate 6 having a hub 6a which can be non-rotatably connected with the rotary input shaft of the variable-speed transmission. The reference character 105 denotes a bearing or another part which can be used to disengage the clutch 5 from the input shaft of the transmission by interrupting the torque-transmitting connection between the secondary flywheel 3 and the clutch plate 6.

The damper 7 comprises an annulus of arcuate energy storing elements 8 in the form of coil springs which alternate with radially outermost portions 11 of a flat disc-shaped member 10 in the radially extending space 52 between the radially inner portion of the chamber 50 and a centrally located axially extending sleeve-like protuberance 26 of the flywheel 2. The member 10 is connected to and rotates with the secondary flywheel 3. The chamber 50 is defined by a toroidal radially outermost portion 9 of the primary flywheel 2, and the portion 9 includes a ring-shaped wall 17 which is welded to the main section of the flywheel 2 and extends substantially radially inwardly at a location to the right of that portion 3' of the flywheel 3 which extends into the space 52. The chamber 50 is at least partially filled with a viscous fluid 53, such as oil or grease. The viscous fluid 53 can serve the sole propose of adequately lubricating the springs 8 and the radially outermost portions 11 of the disc-shaped member 10. It is within the purview of the invention to employ a damper with a single spring 8 or with two or more springs, i.e., the number of radially outermost portions 11 can be reduced to one or can be two or more. By way of example, the damper 8 can comprise two or three or four arcuate coil springs each of which reacts against an internal retainer of the toroidal portion 9 and bears against one of the radially outermost portions 11 of the disc-shaped member 10.

The primary flywheel 2 is made of metallic sheet material and is assembled of a first or main section including the toroidal portion 9, and a second section including the wall 17 which is welded to the adjacent end face of the portion 9. As can be seen in FIG. 1, the main section of the primary flywheel 2 extends radially outwardly from the protuberance 26 (such protuberance can constitute a separately produced part which is welded to the radially innermost portion of the main section) to the toroidal portion 9, and the toroidal portion extends substantially axially in a direction away from the engine (which is assumed to be located to the left of FIG. 1) to surround the radially outermost portion 51 of the chamber 50 and the springs 8 therein, and the wall 17 thereupon extends substantially radially inwardly to terminate radially outwardly of that portion (3') of the secondary flywheel 3 which is encapsulated or interfitted into the primary flywheel, i.e., which extends into the space 52.

The radially outermost portions 11 of the disc-shaped member 10 are inclined in a direction radially outwardly and away from the engine so that they are located in the general plane of the portion 3' in the space 52. The major part of the disc-shaped member 10 is closely adjacent the inner side of radially outwardly extending portion of main section of the primary flywheel 2. The bearing 4 is also coplanar with portion 3' (i.e., it is located in the space 52), the same as the annular friction surface 12 at the right-hand side of the portion 3'. The outer diameter of the friction surface 12 is indicated at R. The two friction linings 13, 14 of the clutch plate 6 are located in the space 52 between the friction surface 12 and the annular friction surface 15 of an axially movable pressure plate 16 of the clutch 5. The latter further comprises a cover 24 which is non-rotatably secured to the radially outermost portion of the secondary flywheel 3 by screws 34 or other suitable fasteners at a location to the right of the wall 17.

The friction surface 15 of the pressure plate 16 also extends into the space 52, at least when the friction surface 15 bears against the adjacent friction lining 13 to thereby urge the other friction lining 14 against the friction surface 12 of the encapsulated or interfitted portion 3' of the secondary flywheel 3.

The just described interfitting or encapsulation of a substantial (preferably major) portion 3' of the flywheel 3, of the entire bearing 4 and of a substantial part of the clutch 5 into the space 52 radially inwardly of the annular chamber 50 and close to the radially outwardly extending portion of main section of the primary flywheel 2 results in considerable reduction of the axial dimension of the apparatus 1 so that such apparatus can be readily installed in spaces which are too narrow for conventional torque transmitting apparatus with composite flywheels. The wall 17 does not interfere with the interfitted or encapsulated portion 3' of the secondary flywheel 3 because the inner diameter of this ring-shaped wall at least matches but is preferably greater than the inner diameter of annulus of coil springs 8 in the radially outermost portion 51 of the annular chamber 50.

The chamber 50 is sealed from the atmosphere by an annular membrane 18 having a radially outermost portion which sealingly engages the wall 17 (i.e., the primary flywheel 2) and a radially innermost portion which sealingly engages the disc-shaped member 10 (i.e., the secondary flywheel 3). An intermediate or median portion of the membrane 18 overlies and closely follows the outline of the portion 3' in the space 52. The intermediate portion of the membrane 18 is closely adjacent the radially inner portions of the coil springs 8 in the annular chamber 50. The locus of sealing engagement between the membrane 18 and the member 10 is shown at 19 and is adjacent to substantially axially extending ventilating openings 20 in the portion 3' radially outwardly of the bearing 4 The openings 20 extend axially and radially of the portion 3'; they communicate with the clearance between the membrane 18 and the portion 3' at the radial level of the connection 19.

At least the radially outermost zone of the portion 3' is provided with heat transfer facilitating or promoting facilities in the form of ribs 21 and grooves alternating with the ribs and serving to promote the flow of air streams from the ventilating openings 20, between the membrane 18 and the portion 3' and out of the space 52 via grooves between the ribs 21. The air stream or air streams can leave the space 52 by way of an outlet 22 which is defined by the wall 17 and the radially outermost portion of the flywheel 3. Thus, the flow of air is directed radially outwardly, namely from the openings 20 toward the outlet 22. Some air can leave the apparatus 1 by way of openings 33 which are provided in the radially outermost portion of the cover 24 and alternate with the fasteners 34 in the circumferential direction of the flywheels. Certain openings 23 can receive balancing or trueing inserts in the form of rivets or the like (one shown by broken lines, as at 25).

The flywheels 2, 3, the bearing 4, the disc-shaped member 10, the friction clutch 5 and the fasteners 28 which serve to connect the flywheel 2 with the rotary output element of an engine together constitute a preassembled unit A which can be readily manipulated in storage, during transport to a repair shop or to an automobile assembling plant, as well as during installation in a motor vehicle The bearing 4 surrounds the sleeve-like protuberance 26 of the primary flywheel 2. The fasteners 28 are allen screws each of which has an externally threaded shank 28a receivable in one of axially parallel holes 27 in the protuberance 26 and a head 28b with a polygonal (normally hexagonal) socket for reception of the working end of a torque transmitting tool T which is used to drive the shanks 28a of the screws 28 into tapped bores in the output element of the engine. The heads 28b of the screws 28 are located to the left of radially inwardly extending elastic prongs 29 forming part of a diaphragm spring 30 which is tiltably mounted at the inner side of the cover 24 and has a circumferentially complete annular radially outer portion surrounding the prongs 29 and bearing against the adjacent projections of the pressure plate 16 when the clutch 5 is engaged. The friction surface 15 of the pressure plate 16 then bears against the friction lining 13, and the friction lining 14 bears against the friction surface 12 of the portion 3' so that the secondary flywheel 3 can rotate the input shaft of the transmission by way of the clutch plate 6 because the hub 6a of the clutch plate non-rotatably surrounds the input shaft.

The externally threaded shanks 28a of the screws 28 preferably do not project beyond the respective holes 27, i.e., beyond the exposed left-hand side 2a of the flywheel 2, while the preassembled unit A is in storage, in transport or in the process of being properly positioned relative to the engine. The means for capturing the screws 28 in the preassembled unit A in the just outlined manner includes deformable (preferably elastic) fastener-engaging parts 31 which can constitute tongues secured (e.g., riveted) to the flange of the clutch plate 6 radially outwardly of the hub 6a and radially inwardly of the friction linings 13, 14. The prongs 29 of the diaphragm spring 30 also contribute to reliable retention of the screws 28 within the confines of the unit A. The fastener-engaging parts 31 can yield when the head 28b of the screw 28 is engaged by the working end of a rotary torque transmitting tool T which pushes the screw 28 axially so that the shank 28a can be driven into the registering tapped bore in the output element of an engine.

The clutch plate 6 is centered between the secondary flywheel 3 and the pressure plate 16 before the preassembled unit A is stored, shipped or applied to an engine. The centering is relative to the output element (e.g., a crankshaft) of the engine so that the centering operation need not take place subsequent to connection of the primary flywheel 2 to the engine. The flange of the clutch plate 6 has openings 32 which are at least partially aligned with the holes 27 of the protuberance 26 as well as with openings 33 which are provided in or between the prongs 29 of the diaphragm spring 30. This ensures that a torque transmitting tool T can be introduced from the right-hand side of the diaphragm spring 30, through an opening 33 in one of the prongs 29 or between two neighboring prongs, and into the socket of a head 28b whereupon the head 28b is disengaged from the deformable part 31 and is ready to transmit torque to the respective shank 28a so that the latter is driven into the output element of an engine. In the apparatus which is shown in FIG. 1, the openings 32 are sufficiently large to permit the heads 28b of screws 28 to pass therethrough, i.e., the heads 28b can move all the way against the aligned prongs 29. However, the openings 33 in or between the prongs 29 are too small so that the heads 28b cannot pass through them and the screws 28 are protected against loss or misplacement.

The openings 33 (see FIG. 2) of the diaphragm spring 30 constitute enlarged portions of slots between neighboring prongs 29. The dimensions of the openings 33 and 32 are selected in such a way that they are in adequate alignment with each other and with the corresponding holes 27 in the protuberance 26 even if the spacing of holes 27 (in the circumferential direction of the flywheel 2) is not uniform. Such non-uniform spacing is relied upon if the flywheel 2 is to be connected with the output element of the engine in a single predetermined angular position Reference may be had, for analogy, to commonly owned U.S. Pat. No. 4,493,409 granted Jan. 15, 1985 to Klaus Steeg. All that counts is to ensure that the working end of a torque transmitting tool T (e.g., an allen wrench) can pass first through an opening 33 and then through the fully or partially aligned opening 32 to enter the socket in one of the heads 28b preparatory to disengagement of the head 28b from the respective deformable part 31 and rotation of the respective screw 28 so that the shank 28a can be driven into the output element of the engine, even if the distribution of holes 27 in the protuberance 26 is not uniform. As mentioned above, the openings 33 are dimensioned in such a way that the prongs 29 intercept the heads 28b of screws 28 in a preassembled unit A. At the same time, the parts 31 maintain the screws 28 in such axial positions that the shanks 28a do not project beyond the exposed outer side 2a of the flywheel 2.

The preassembled unit A further comprises a pilot bearing 34a for the input element of the transmission. This pilot bearing is installed in the passage of the sleeve-like protuberance 26 on the primary flywheel 2. The input shaft of the transmission is inserted into the pilot bearing 34a when the step of connecting the primary flywheel 2 to the engine is completed.

The unit A contributes significantly to convenience of attachment of the flywheel 2 to the engine. Thus, the clutch plate 6 can be properly centered before the flywheel 2 is attached to a crankshaft or to another rotary output element, and such clutch plate is already in place between the flywheel 3 and the pressure plate 16 even before the flywheel 2 is connected to the engine. Moreover, the clutch 5 is properly connected to the flywheel 3 at the time the flywheel 2 is to be attached to the engine, and it is not necessary to manipulate a centering mandrel which is normally needed to properly position the clutch plate with reference to the output element of the engine. Still further, the screws 28 are in optimum positions to be driven into the output element of the engine, the screws 34 are already driven home and the centering mandrel is not in the way as in connection with attachment of conventional torque transmitting apparatus.

The person in charge removes the screws 34 if it becomes necessary to gain access to the normally confined parts, such as the clutch plate 6. Thus, a worn clutch plate can be replaced with little loss in time.

The illustrated friction clutch 5 is of the depressible type, i.e., the bearing 105 must be moved to the left (as seen in FIG. 1) in order to depress the free radially inner ends of the prongs 29 and to thus tilt the diaphragm spring 30 relative to the cover 24 so that the pressure upon the projections of the pressure plate 16 is relaxed and the pressure plate can be pulled axially and away from the secondary flywheel 3. This enables the flywheel 3 to rotate relative to the clutch plate 6, i.e., the transmission of torque from the engine to the input element of the transmission is interrupted. The diaphragm spring 30 is tiltable between two annular seats 35 and 36. The seat 35 is located between the cover 24 and the annular portion of the diaphragm spring 30, and the seat 36 is located at the other side of the diaphragm spring, namely between this spring and the pressure plate 16.

The seat 36 is integral with a washer-like carrier 37 (see particularly FIG. 2) which, in turn, is integral with torque transmitting leaf springs 38 extending radially inwardly as well as in the circumferential direction of the flywheels 2, 3 from the seat 36 toward the pressure plate 16. The leaf springs 38 rotate the pressure plate 16 and tend to pull this pressure plate away from the adjacent friction lining 13 on the clutch plate 6. Those ends of the leaf springs 38 which are connected to the pressure plate 16 are located radially inwardly of the friction surface 15. The means for connecting the free ends of the leaf springs 38 to the pressure plate 16 comprises pairs of rivets 39, 40. The composite part including the seat 36, the carrier 37 and the leaf springs 38 can be made of springy metallic sheet material.

Figure 2:
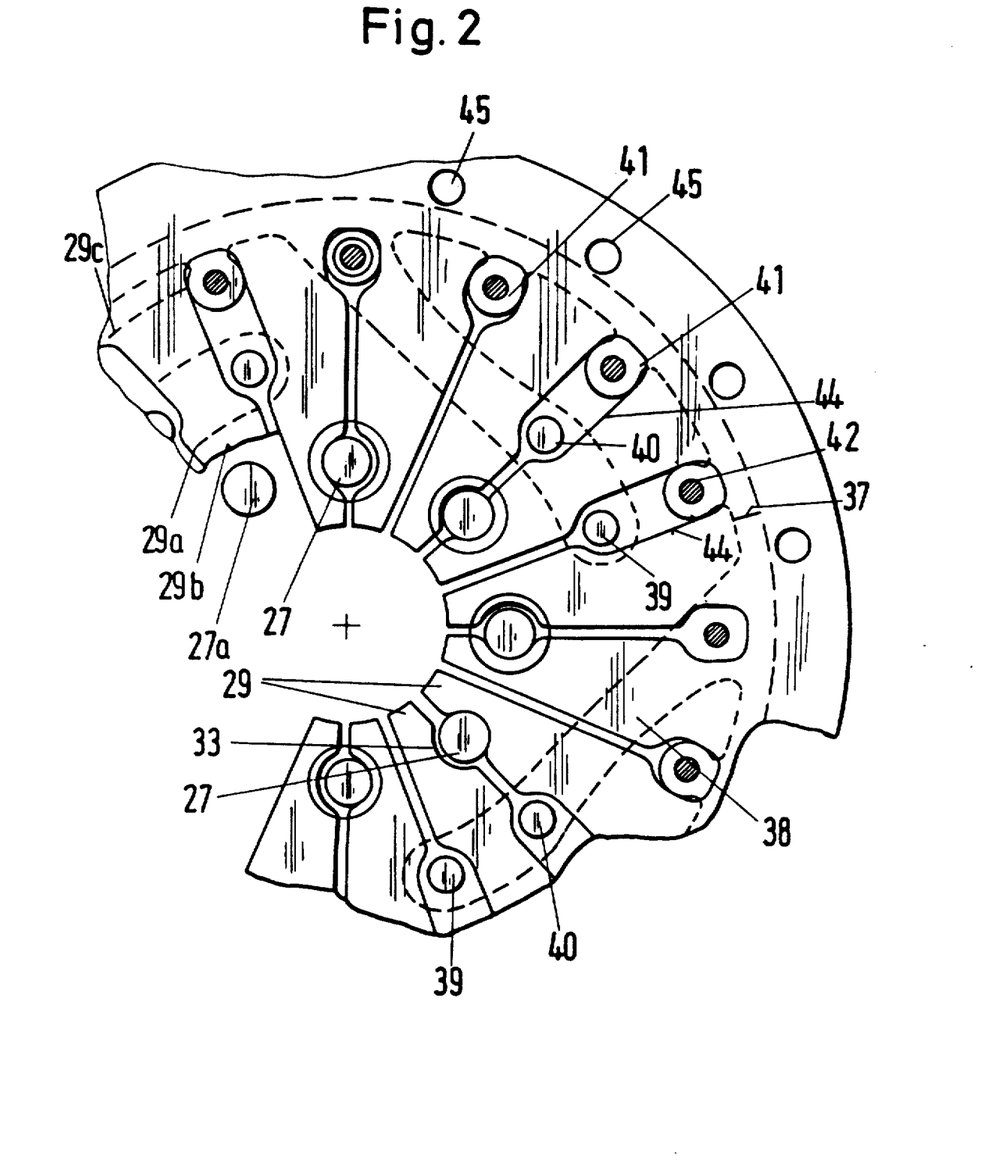
FIG. 2 is a fragmentary elevational view of certain details of the apparatus, substantially as seen in the direction of arrows from the line II—II in FIG. 1.

The carrier 37 of the seat 36 and of the leaf springs 38 is connected with the clutch cover 24 by several lugs 41 which have openings 42 for fasteners in the form of rivets 43 constituted by integral projections of the cover 24. The free ends of the projections are upset to ensure that the lugs 41 are properly connected to the cover 24.

FIG. 2 shows that certain slots between the prongs 29 of the diaphragm spring 30 are enlarged, as at 44, in the radial direction of the diaphragm spring so as to register with the locations for application of the rivets 39, 40. This simplifies the task of connecting the free ends of the leaf springs 38 to the pressure plate 16. The rivets 39, 40 can be applied subsequent to attachment of the diaphragm spring 30 to the cover 24.

The circumferentially complete annular radially outer portion of the diaphragm spring 30 is provided with several openings 45 in the form of circular holes or bores which serve to permit the flow of cooling air streams when the apparatus 1 is in actual use.

The distribution of holes 27 in the protuberance 26 of the primary flywheel 2 can be highly irregular, i.e., certain holes 27 can be near to and certain other holes can be much more distant from each other, as seen in the circumferential direction of the bearing 4. This is indicated in FIG. 2 wherein the distance of the hole 27a from the neighboring hole 27 is considerably less than the distance of other holes 27 from each other. Therefore, the prong 29a behind the hole 27a is cut off, as at 29b, radially outwardly of such hole. Alternatively, the entire prong 29a can be cut off at 29c. As a rule, it is desirable to cut the prong 29a off at 29b because this reduces the likelihood of pronounced imbalance of the diaphragm spring 30.

An important advantage of the improved torque transmitting apparatus 1 is its compactness in the axial direction of the flywheels 2, 3 in spite of the fact that the apparatus employs a disc-shaped member 10 which fills a portion of the space 52, i.e., in spite of the fact that the portion 3' of the secondary flywheel 3 is not placed into immediate proximity to the radially extending portion of main section of the primary flywheel 2. The space 52 not only receives the major portion 3' of the secondary flywheel 3 but also a substantial part of the friction clutch 5. Thus, the two friction surfaces 12, 15 (and hence the friction linings 13, 14 of the clutch plate 6) can be confined in the space 52. The outer diameters of the friction surface 15 and of the friction linings 13, 14 equal or approximate the outer diameter R of the friction surface 12.

The membrane 18 also contributes to compactness of the improved apparatus. Thus, the thickness of this membrane is but a small fraction of the thickness of the wall 17 and/or other portions of the primary flywheel 2. The membrane 18 is located radially inwardly of the supply of viscous fluid 53 when the improved apparatus 1 is in use. Therefore, the membrane is not acted upon by centrifugal force which urges the viscous fluid radially outwardly into the portion 51 of the annular chamber 50 when the engine drives the flywheels 2 and 3. In other words, the membrane 18 merely performs a pure sealing action to prevent penetration of air and/or contaminants into the chamber 50 and to prevent escape of viscous fluid 53 when the flywheels 2 and 3 are idle. Since the fluid 53 is viscous, it is highly unlikely to flow out of the radially outermost portion 51 of the chamber 50 and radially inwardly toward the membrane 18. If the viscosity of entrapped fluid 53 is reduced as a result of unanticipated overheating, the relatively thin membrane 18 is still capable of preventing escape of such fluid from the chamber 50. The axially extending portion of the membrane 18 can closely follow the outlines of radially inner portions of the springs 8 so that it provides ample room for a large-diameter portion 3' of the secondary flywheel 3 in the space 52. Thus, the friction surface 12 of the flywheel 3 can have a large outer diameter R. The radially extending inner portion of the membrane 18 closely follows the outline of adjacent portion 3' of the flywheel 3 so that it takes up little room and enables the space 52 to receive a larger part of the friction clutch 5, namely a part which includes the friction surface 15 on the axially movable pressure plate 16.

The membrane 18 further serves as a shroud along the path of air streams which cool the portion 3' of the secondary flywheel 3 on their way from the openings 20 toward the channels or grooves between the ribs 21 which guide such air streams into the openings 23 and/or into the outlet 22. The ribs 21 and/or the grooves or channels between such ribs contribute to an intensivification of air flow from the space 52 into the openings 23 and/or into the outlet 22 to thus enhance the cooling action upon the secondary flywheel 3.

The screws 28 can be held captive in the preassembled unit A solely by the deformable or yieldable parts 31, by making the openings 32 too small for the heads 28b of such screws and/or by making the openings 33 too small for the heads 28b. However, the openings 32 and 33 should be sufficiently large to permit convenient introduction of the working end of an allen wrench or another suitable torque transmitting tool, even if the openings 32 are not in full alignment with the holes 27 and/or if the openings 33 are not in full alignment with the openings 32.

All such parts of the improved apparatus 1 which are not expected to require separation (for example, the toroidal portion 9 and the wall 17 of the primary flywheel 2, and/or the radially extending portion of main section of the primary flywheel 2 and the protuberance 26) can be permanently connected to each other, particularly by welding.

The aforedescribed design of the friction clutch 5 also contributes to compactness of the improved apparatus. Thus, the carrier 37 not only includes one (36) of the two seats (35, 36) for the diaphragm spring 30 but it also serves to transmit torque to the pressure plate 16 as well as to pull the pressure plate away from the friction linings of the clutch plate 6 when the pressure plate is not biased by the annular portion of the diaphragm spring 30. This is accomplished by the novel expedient of providing the carrier 37 with the torque transmitting leaf springs 38. The leaf springs 38 render it possible to dispense with the customary radially outwardly extending projections which are provided on the pressure plates of presently known friction clutches and serve to receive rivets which connect them with leaf springs. The leaf springs connect the radially outwardly extending projections of the pressure plate to the cover of a presently known friction clutch. Reference may be had to FIG. 1 of the aforementioned commonly owned U.S. Pat. No. 4,989,710 and/or to FIG. 5 of commonly owned U.S. Pat. No. 4,747,586 granted May 31, 1988 to Wolfgang Reik. Thus, the radial dimensions of the entire pressure plate 16 can be reduced to a considerable extent by the novel expedient of locating the leaf springs 38 radially inwardly of the seats 35, 36 for the diaphragm spring 30. The assembly of the friction clutch 5 is simplified due to the fact that the illustrated carrier 37 is integral with the seat 36 and with the leaf springs 38.

The illustrated mode of securing the carrier 37 to the cover 24 also contributes to simplicity and compactness of the friction clutch 5. Thus the carrier 37 is simply provided with radially inwardly extending lugs 41 having openings 42 for deformable integral projections (rivets) 43 of the cover 24. The relatively long distance between the outer diameter of the carrier 37 and the locations of attachment to the cover 24 renders it possible to adjust the carrier in the event of extensive wear upon the diaphragm spring 30 and/or seats 35, 36.

The improved apparatus can be modified in a number of ways without departing from the spirit of the invention. For example, the chamber 50 can be designed to receive two annuli of energy storing elements which operate in parallel, the holes 27 for the screws 28 can be provided radially outwardly of the bearing 4 (i.e., the dimensions and cost of the bearing can be reduced), the one-piece membrane 18 can be replaced with several discrete seals for preventing escape of viscous fluid 53 from the chamber 50, and the transmission of torque between the cover 24 and the pressure plate 16 of the friction clutch 5 can be effected in a way other than with leaf springs 38 which are integral with one (36) of the seats 35, 36 for the diaphragm spring 30 The entire toroidal portion 9 can be shifted relative to the remaining (radially extending) portion of main section of the flywheel 2 so that the space 52 is even deeper and can receive a larger part of the clutch 5 and flywheel 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for transmitting torque in a motor vehicle, comprising a first rotary flywheel connectable with an engine of the vehicle and including a toroidal portion defining at least a portion of an annular chamber which is at least partially filled with a viscous fluid; a second rotary flywheel which is connectable with a transmission of the vehicle by a clutch having an annular friction surface; at least one bearing between said flywheels; at least one damper provided in said chamber to oppose rotation of said flywheels relative to each other, said at least one damper including energy storing elements acting in the circumferential direction of said chamber; and a substantially disc-shaped member rotatable with said second flywheel and having portions extending into said chamber and engaging said energy storing elements, said toroidal portion being disposed radially outwardly of said friction surface and surrounding a space, at least a portion of said second flywheel extending into said space in the axial direction of said second flywheel.

2. The apparatus of claim 1, wherein said second flywheel has a second friction surface which is disposed in said space.

3. The apparatus of claim 1, wherein said portions of said member are inclined in a direction outwardly and away from said first flywheel and are disposed radially outwardly of said portion of said second flywheel.

4. The apparatus of claim 1, wherein said second flywheel has a second friction surface and said portion thereof is encapsulated into said first flywheel within said space, at least a portion of said at least one bearing and said second friction surface being located in said space.

5. The apparatus of claim 4, wherein said at least one bearing is fully received in said space and said portion of said second flywheel constitutes the major part of said second flywheel.

6. The apparatus of claim 1, wherein said second flywheel has a second friction surface and said clutch comprises a clutch plate having friction linings disposed in said space between said friction surfaces.

7. The apparatus of claim 1, wherein said friction surface is provided on a pressure plate of said clutch and is disposed in said space.

8. The apparatus of claim 1, wherein said toroidal portion includes a substantially ring-shaped wall which spacedly surrounds said portion of said second flywheel and has a first inner diameter, said energy storing elements together forming an annulus having a second inner diameter at most matching said first inner diameter.

9. The apparatus of claim 8, further comprising an annular membrane having a radially outer portion sealingly engaging said wall, said membrane overlying said portion of said second flywheel in said space and having a radially inner portion sealingly engaging said member.

10. The apparatus of claim 9, wherein said second flywheel has ventilating openings adjacent said membrane.

11. The apparatus of claim 1, wherein said portion of said second flywheel includes a radially outermost zone and at least said zone of said portion of said second flywheel includes heat transfer enhancing facilities.

12. The apparatus of claim 11, wherein said facilities include ribs.

13. The apparatus of claim 11, wherein said flywheels define an outlet which connects said space with the atmosphere and said facilities include passages communicating with said outlet.

14. The apparatus of claim 1, wherein said clutch includes a cover and a clutch plate, said clutch and said flywheels together constituting a preassembled unit which is connectable to the engine by connecting the engine with said first flywheel.

15. The apparatus of claim 14, wherein said at least one bearing forms part of said unit.

16. The apparatus of claim 15, wherein said first flywheel comprises a centrally disposed axial protuberance which is surrounded by said at least one bearing, said protuberance having holes and further comprising fasteners receivable in said holes to connect said first flywheel to a rotary output element of the engine.

17. The apparatus of claim 16, further comprising means for confining said fasteners in said unit against loss.

18. The apparatus of claim 17, wherein said confining means includes deformable fastener-engaging parts in said unit.

19. The apparatus of claim 14, wherein said clutch further comprises a pressure plate, said clutch plate being disposed between and being centered by said second flywheel and said pressure plate.

20. The apparatus of claim 14, wherein said first flywheel has holes and further comprising fasteners insertable into said holes to connect said first flywheel to a rotary output element of the engine, said clutch further comprising a pressure plate and said clutch plate being centered between said second flywheel and said pressure plate and having openings each of which is in at least partial alignment with one of said holes.

21. The apparatus of claim 14, wherein said first flywheel has holes and further comprising fasteners insertable into said holes to connect said first flywheel to a rotary output element of the engine, said clutch further comprising a pressure plate which is provided with said friction surface and a spring arranged to bias said friction surface of said pressure plate against said clutch plate and to thereby bias said clutch plate against said second flywheel, said spring having prongs provided with openings in at least partial axial alignment with said holes to permit insertion of a tool for manipulation of said fasteners.

22. The apparatus of claim 21, wherein said clutch plate has openings in at least partial alignment with the openings of said prongs and with the holes of said first flywheel.

23. The apparatus of claim 21, wherein the openings of said prongs are equidistant from each other in the circumferential direction of said flywheels and are larger than necessary to permit passage of the manipulating tool so as to enable the tool to pass through the openings of said clutch plate even if the openings in said clutch plate are in mere partial alignment with the openings of said prongs.

24. The apparatus of claim 21, wherein said fasteners have heads and the dimensions of openings in said prongs are too small to permit passage of said heads.

25. The apparatus of claim 14, wherein said first flywheel has an outer side and is provided with holes terminating in said outer side, and further comprising fasteners having shanks extending into said holes and heads disposed between said first flywheel and a diaphragm spring of said clutch, said clutch providing room for said heads between said spring and said first flywheel so that said shanks need not extend through said holes and beyond said outer side prior to connection of said first flywheel to a rotary output element of the engine.

26. The apparatus of claim 14, further comprising means for separably securing said clutch to said second flywheel.

27. The apparatus of claim 1, further comprising a pilot bearing provided on said first flywheel and arranged to center a rotary input element of the transmission when the second flywheel is connected to the transmission.

28. The apparatus of claim 27, wherein said first flywheel further comprises a centrally located annular protuberance supporting said at least one bearing and defining a passage, said pilot bearing being disposed in said passage.

29. The apparatus of claim 1, wherein said clutch includes a cover which is secured to said second flywheel, a clutch plate between said second flywheel and said cover, a pressure plate provided with said friction surface and disposed between said cover and said clutch plate, a diaphragm spring disposed between said cover and said pressure plate and having an outer portion arranged to bear against said pressure plate to thereby engage said friction surface with said clutch plate and to thus urge the clutch plate against said second flywheel, a first annular seat disposed between said diaphragm spring and said cover radially inwardly of said outer portion, a second annular seat disposed between said spring and said pressure plate radially inwardly of said outer portion, and a washer-like carrier for said second seat, said carrier having integral torque transmitting leaf springs connected with said pressure plate radially inwardly of said second seat.

30. The apparatus of claim 29, wherein said leaf springs slope radially inwardly and in the circumferential direction of said flywheels from said second seat toward said pressure plate.

31. The apparatus of claim 29, further comprising means for connecting said leaf springs to said pressure plate radially inwardly of said friction surface.

32. The apparatus of claim 29, wherein said carrier includes substantially inwardly extending projections which are affixed to said cover.

33. The apparatus of claim 29, further comprising rivets securing said carrier to said cover.

34. The apparatus of claim 29, further comprising means for securing said carrier to said cover, including lugs provided on said carrier and having openings, and fasteners extending through said openings and securing said lugs to said cover.

35. The apparatus of claim 29, wherein said diaphragm spring further comprises prongs extending radially inwardly from said annular portion and separated from each other by slots, said slots having enlarged radially outer portions and further comprising rivets securing said leaf springs to said pressure plate, said enlarged portions being in alignment with said rivets.

36. The apparatus of claim 29, further comprising a plurality of fasteners connecting each of said leaf springs to said pressure plate.

37. The apparatus of claim 29, wherein said second seat is integral with said carrier.

38. Apparatus for transmitting torque in a motor vehicle, comprising a first rotary flywheel connectable with an engine of the vehicle and including a toroidal portion defining a first portion of an annular chamber and a ring-shaped wall defining a second portion of said chamber and having a first inner diameter; a second flywheel coaxial with and rotatable relative to said first flywheel and connectable with a transmission of the vehicle; and at least one damper provided in said chamber and operative to oppose rotation of said flywheels relative to each other, said damper including an annulus of circumferentially acting energy storing elements and said annulus having a second inner diameter which at most equals said first inner diameter.

39. Apparatus for transmitting torque in a motor vehicle, comprising a first rotary flywheel connectable with an engine; a second flywheel rotatable relative to and coaxial with said first flywheel and connectable with a transmission of the vehicle by a friction clutch having a pressure plate, a cover and a clutch plate; at least one bearing between said flywheels, said first flywheel comprising a centrally disposed axial protuberance which is surrounded by said at lest one bearing and said first flywheel having holes; fasteners receivable in said holes to connect said first flywheel to a rotary output element of the engine, said flywheels and said clutch together constituting a preassembled unit which is connectable to said rotary output element of the engine by connecting the first flywheel to the output element; and means for confining said fasteners in said unit against loss, said clutch plate being centered between said second flywheel and said pressure plate and having openings each of which is in at least partial alignment with one of said holes.

40. Apparatus for transmitting torque in a motor vehicle, comprising a first rotary flywheel connectable with an engine of the vehicle; and a second flywheel rotatable relative to and coaxial with said first flywheel and connectable to a transmission of the vehicle by a friction clutch having a clutch plate adjacent said second flywheel, a cover connected with said second flywheel, a pressure plate disposed between said cover and said clutch plate, a diaphragm spring disposed between said cover and said pressure plate and including a outer portion arranged to bear against said pressure plate to thereby engage said pressure plate with said clutch plate and thus urge said clutch plate against said second flywheel, a first annular seat disposed between said diaphragm spring and said cover radially inwardly of said outer portion, a second annular seat disposed between said spring and said pressure plate radially inwardly of said outer portion, and a substantially washer-like carrier for said second seat, said carrier having integral torque transmitting leaf springs connected with said pressure plate radially inwardly of said second seat.

* * * * *